Patented Mar. 7, 1933

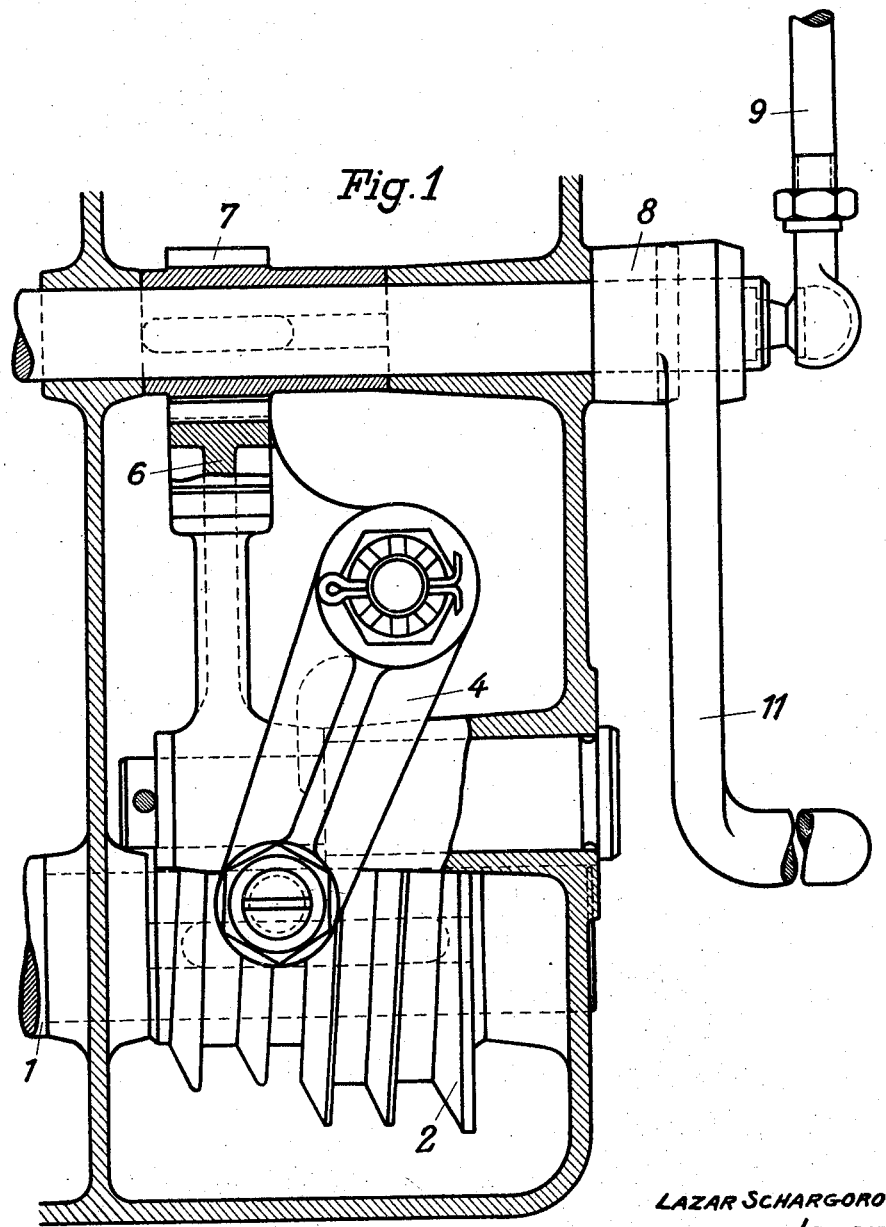

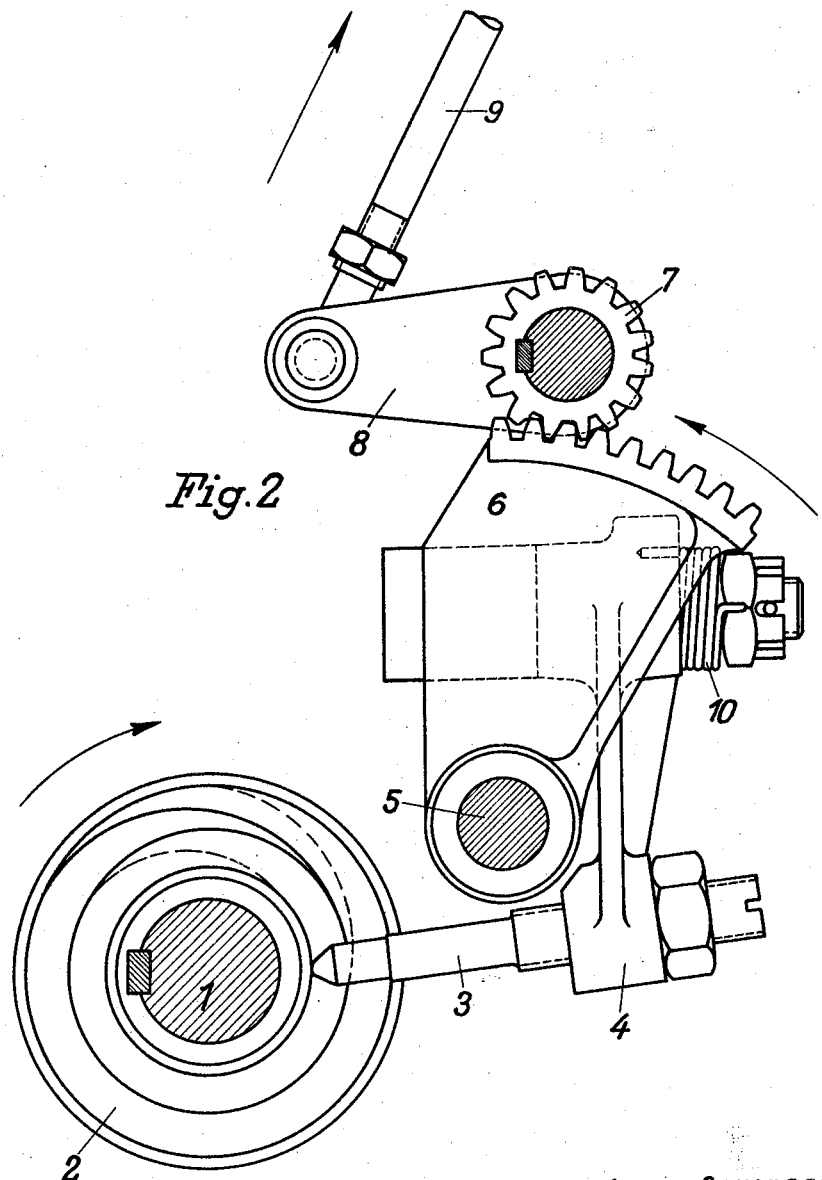

1,900,367

UNITED STATES PATENT OFFICE

LAZAR SCHARGORODSKY, OF HANOVER, GERMANY, ASSIGNOR TO THE FIRM HANNOVERSCHE MASCHINENBAU-ACTIEN-GESELLSCHAFT VORMALS GEORG EGESTORFF HANOMAG, OF HANOVER-LINDEN, GERMANY

MEANS FOR STARTING INTERNAL COMBUSTION ENGINES

Application filed August 15, 1930, Serial No. 475,610, and in Germany November 7, 1929.

My invention relates to internal combustion engines, especially of the type working with compression, and has for its object to provide improved means for automatically switching on the compression while the motor is being started.

In internal combustion engines, particularly in Diesel engines, which are started without compression, the compression is only switched on after the motor has been previously caused to revolve by turning the cranks by hand or mechanically. When this method is employed it is a disadvantage that two operations are required one for starting the motor and one for switching on the compression (closing of the exhaust valves). Attempts have already been made to replace the second operation, the closing of the exhaust valves, by an automatic operation, a lever which closes the exhaust valves being caused to engage in such a way with a screw thread communicating with the motor that the point of connection in communication with the lever when the motor is started has to follow the screw threads by which movement the closing of the exhaust valves is brought about.

This arrangement did not however afford any satisfactory solution of the problem, because the lever could only be brought back into the position of rest with great difficulty, as the sliding pin ran in the screw thread and was consequently subjected to friction.

The present invention enables the compression to be switched on in a simple and automatic manner which is reliable in its action inasmuch as it forms the screw thread for the guiding of the lever which switches on the compression in such a way that the sliding pin of the lever when sliding to the end of the screw thread passes out of the path of the flanks of the screw thread, so that by the help of a spring acting in opposition to the screw thread it is swung backwards in the plan in which it oscillates freely over the threads of the screw into its original position, in which it remains (until thrown into operation again) out of engagement with the screw thread and is therefore not subjected to any friction.

This action may be achieved by the use of a conical screw thread, or by the use of a screw threaded spiral, the outlet of the screw thread being provided above the flank of the screw threaded spiral. In this case it is supposed that the sliding pin which is well known per se, swings back into the plane which it has assumed on its exit from the screw threads.

An embodiment of my invention is illustrated in the drawings by way if example.

Fig. 1 is a longitudinal section and Fig. 2 a side elevation.

The arrangement which worked with a straight screw thread has not been shown as it is readily comprehensible. The screw thread is arranged as in a gramophone turntable but the screw thread is placed at such a height that the sliding pin can swing back over the threads of the screw into its original position. In this arrangement it is immaterial whether the pin be introduced into the spiral from the outside towards the inside or from the inside to the outside.

On any shaft 1 in connection with the motor gearing is provided a conical screw threaded portion 2 in which the pin 3 of a lever 4 engages, which is coupled to a toothed segment oscillating about the axle 5. When starting the pin 3 is in the lowest thread of the conical screw thread 2 and slides as the shaft 1 rotates further into the conical screw thread, until it quits the thread at the highest point. During this movement of the pin 3 the segment 6 is rotated and this movement is employed by means of the gear wheel 7 in the well known way to bring about the intended action namely the closing of the exhaust valves, and in the example shown this is effected by the rods and levers 9 operated by the lever 8.

The toothed segment 6, rotates in one plane and the pin 3, through the lever 4, simultaneously moved at right angles to this plane. The lever 4, is pivotally mounted relative to the toothed segment 6, and is spring pressed by the coil spring 10, whereby the pin 3, on becoming disengaged from the screw threaded shaft 1, at approximately the end of its travel in said screw, automatically flies back towards the smallest. The pin 3, is automatically pressed under the influence of the spring 10, to engage with the threads of the conical screw threaded shaft 1, and as this shaft rotates, travels in the threads until it reaches the highest point where it becomes disengaged, but under the influence of the spring 10, swings back over the threads of the groove into its original position.

The toothed segment 6 remains during the continued working of the motor in the operative position notwithstanding the operation of the exhaust valves otherwise. If on the contrary the motor is to be started again after having been stopped it is necessary to introduce the pin 3 into the threads of the screw threaded portion 2 again. This is accomplished by the help of the crank handle 11, by which the gear wheel 7 is turned backwards and consequently also the toothed segment 6 into the position of rest shown in Fig. 2, the pin 3 returning positively to its real original position that is to say it also engages in the screw thread of the smallest diameter.

From the foregoing, it will be seen that when the shaft 1, rotates with the spiral or conical threaded portion 2, thereon in engagement with the pin 3, at the foreward end or starting point, this pin, as the shaft continues to rotate, will travel in the grooves of the threaded portion, gradually moving backwardly causing the rod 6, through the centre of rotation 5, to move in the opposite direction as indicated by the arrow (Fig. 2) and causing the ratchet wheel 7, to operate in turn the rod 9, to close the exhaust valves. This progressive movement backwardly of the pin 3, in the threaded portion 2, also tensions the spring 10, so that when the pin 3, reaches the end of its travel in the portion 2, and becomes disengaged therefrom, it will, under the influence of the spring 10, automatically spring back and lie above and parallel with the threaded portion 2, in position on the ratchet 7, being operated by lever 11, to assume its original position in engagement with the threaded portion 2, at the forward extremity thereof.

What I claim as my invention and desire to secure by Letters Patent of the United States of America, is:—

1. Mechanism for closing the exhaust when starting internal combustion engines comprising a rotary shaft formed with a worm portion, a second shaft, a toothed segment rotating about the second shaft, a lever arm pivotally associated with said segment, a pin carried by said arm for engagement with said worm whereby on the worm shaft being rotated, the toothed segment rotates in one plane and the pin oscillates in a plane at right angles to the aforementioned plane in engagement with the worm.

2. Mechanism for closing the exhaust when starting internal combustion engines comprising a rotary shaft formed with a compelling worm portion, a second shaft, a toothed segment rotating about the second shaft, a lever arm operatively associated with said segment, a pin carried by said arm for engagement with the worm shaft whereby on the worm shaft being rotated, the toothed segment rotates in one plane and the pin oscillates in a plane at right angles to the aforementioned plane in engagement with the worm shaft, and mechanism operatively connected to the segment and the exhaust, and spring pressed means for automatically causing the pin to assume its original position relative to the worm shaft on reaching the end of its travel therein.

3. A device for automatically switching on the compression when starting internal combustion engines comprising a motor driven shaft provided with a screw threaded portion, a second shaft, a toothed segment oscillating about the second shaft, a spring held lever pivotally mounted on said segment, a worm engaging member associated with said lever for slidable engagement with the worm shaft whereby on the worm shaft being rotated, the worm engaging member and the segment are operated in planes at substantially right angles to one another, mechanism operatively connecting the segment with the exhaust valve whereby on the simultaneous operation of the segment and the worm engaging member, the exhaust valves are automatically closed.

4. In mechanism of the character described for switching on the compression when starting internal combustion engines, a motor driven shaft provided with a conical worm portion, a pair of members oscillating in planes at substantially right angles to one another, and means associated with one of said members for operative engagement with the worm shaft, and means associated with the other oscillating member for operating the exhaust valve to close them.

In testimony whereof I affix my signature.

LAZAR SCHARGORODSKY.